United States Patent
Lee et al.

(10) Patent No.: US 8,903,024 B2
(45) Date of Patent: Dec. 2, 2014

(54) APPARATUS AND METHOD FOR ITERATIVE DETECTION AND DECODING IN WIRELESS COMMUNICATION SYSTEM

(75) Inventors: Yong Ho Lee, Ulsan (KR); Pan Soo Kim, Daejeon (KR); Deock Gil Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 155 days.

(21) Appl. No.: 13/609,618

(22) Filed: Sep. 11, 2012

(65) Prior Publication Data
US 2013/0156136 A1 Jun. 20, 2013

(30) Foreign Application Priority Data
Dec. 14, 2011 (KR) .................. 10-2011-0134506

(51) Int. Cl.
*H04L 27/06* (2006.01)
(52) U.S. Cl.
USPC ............ 375/340; 375/324; 375/341; 714/794
(58) Field of Classification Search
USPC .......................... 375/324, 340–341; 714/794
See application file for complete search history.

(56) References Cited

U.S. PATENT DOCUMENTS
2004/0032347 A1* 2/2004 Yamazaki ................. 341/50

OTHER PUBLICATIONS

Chien-Ming Wu, et al; "Memory Arrangements in Turbo Decoders Using Sliding-Window BCJR Algorithm", IEEE International Symposium on Circuits and Systems, 2002. ISCAS 2002; vol. 5; pp. V-557-V-560.

* cited by examiner

*Primary Examiner* — Curtis Odom
(74) *Attorney, Agent, or Firm* — Ladas & Parry LLP (57) ABSTRACT

Provided is an apparatus and method for iteratively detecting and decoding a received signal in a wireless communication system. An apparatus for iterative detection and decoding (IDD) in a wireless communication system may determine a predetermined group to be updated in a first soft decision sequence, may transmit detection control information of the determined group, and may generate a second soft decision sequence based on a detection operation result of a predetermined received signal portion that is extracted based on the detection control information.

18 Claims, 7 Drawing Sheets

APPARATUS AND METHOD FOR ITERATIVE DETECTION AND DECODING IN WIRELESS COMMUNICATION SYSTEM

CROSS-REFERENCE TO RELATED APPLICATION

This application claims the priority benefit of Korean Patent Application No. 10-2011-0134506, filed on Dec. 14, 2011, in the Korean Intellectual Property Office, the disclosure of which is incorporated herein by reference.

BACKGROUND

1. Field of the Invention

The present invention relates to an apparatus and method for iteratively detecting and decoding a received signal in a wireless communication system.

2. Description of the Related Art

A maximum likelihood (ML) receiver is known as an optimal method to detect a received signal in far field communication. However, when a length of transmission sequence increases for high efficiency transmission, or when a plurality of bits is assigned per symbol, hardware complexity and a calculation amount may nonlinearly increase and thus, it may be difficult to realize the above scheme in the reality.

Also, in the case of a method currently in the spotlight, that is, an iterative detection and decoding (IDD) method in which a detector and a decoder are concatenated and thereby iteratively operate, the complexity and the calculation amount may become further serious issues.

SUMMARY

An aspect of the present invention provides an apparatus and method that may decrease a calculation amount required to detect a received signal and may also decrease output latency by partially updating a soft decision value of a received signal sequence in an iterative detection and decoding (IDD) scheme.

According to an aspect of the present invention, there is provided an apparatus for iterative detection and decoding in a wireless communication system, the apparatus including: an update controller to determine a predetermined group to be updated in a first soft decision sequence, and to transmit detection control information of the determined group; and a detector to generate a second soft decision sequence based on a detection operation result of a predetermined received signal portion that is extracted based on the detection control information.

The detector may include: a received signal extractor to extract a predetermined received signal portion from a received signal sequence based on the detection control information; and a partial updater to generate the second soft decision sequence by updating a soft decision value of a portion corresponding to the determined group in the first soft decision sequence, based on the detection operation result of the extracted received signal portion.

The update controller may include a divider to divide the first soft decision sequence with a predetermined length into a plurality of groups based on a predetermined criterion.

The update controller may further include a determining unit to determine groups to be updated among the plurality of groups based on a predetermined criterion.

The update controller may include a transmitter to transmit detection control information including an index of the determined group, length information of the determined group, and additional control information.

When a recursive operation requiring an initialization is included in an operation of the detector, the received signal extractor may extract a predetermined received signal portion from the received signal sequence by adding a traceback length to front or back of a portion corresponding to the determined group in the received signal sequence.

When a recursive operation requiring an initialization is not included in an operation of the detector, the received signal extractor may extract a received signal portion corresponding to the determined group from the received signal sequence.

The detector may perform a detection operation with respect to the extracted received signal portion.

The partial updater may include a soft decision value calculator to calculate the soft decision value of the portion corresponding to the determined group in the first soft decision sequence, based on the detection operation result and information about the determined group.

The partial updater may further include an updater to update, with the calculated soft decision value, the portion corresponding to the determined group in the first soft decision sequence.

The IDD apparatus may further include: a de-interleaver to perform de-interleaving of the second soft decision sequence; a decoder to generate a third soft decision sequence by performing decoding using a predetermined decoding algorithm with respect to the de-interleaved second soft decision sequence; and an iteration controller to control whether to perform iterative detection and decoding by determining whether the number of iterative detections satisfies a predetermined number of times.

According to another aspect of the present invention, there is provided a method for iterative detection and decoding in a wireless communication system, the method including: determining a predetermined group to be updated in a first soft decision sequence, and transmitting detection control information of the determined group; extracting a predetermined received signal portion from a received signal sequence based on the detection control information; and generating a second soft decision sequence by updating a soft decision value of a portion corresponding to the determined group in the first soft decision sequence, based on the detection operation result of the extracted received signal portion.

The transmitting may include dividing the first soft decision sequence with a predetermined length into a plurality of groups having the same length.

The transmitting may further include determining, as groups to be updated among the plurality of groups, groups of which measured signal to noise ratio (SNR) is less than or equal to a predetermined threshold.

Each of the first soft decision sequence and the second soft decision sequence may be a log likelihood ratio (LLR).

The generating may include calculating the soft decision value of the portion corresponding to the determined group in the first soft decision sequence, based on the detection operation result and information about the determined group.

The generating may further include updating, with the calculated soft decision value, the portion corresponding to the determined group in the first soft decision sequence.

The IDD method may further include: performing de-interleaving of the second soft decision sequence; generating a third soft decision sequence by performing decoding using a predetermined decoding algorithm with respect to the de-interleaved second soft decision sequence; and performing interleaving of the third soft decision sequence when the number of iterative detections does not satisfy a predetermined number of times.

EFFECT

According to embodiments of the present invention, there may be provided an apparatus and method that may decrease a calculation amount required to detect a received signal and may also decrease output latency by partially updating a soft decision value of a received signal sequence in an iterative detection and decoding (IDD) scheme.

According to embodiments of the present invention, since an existing detection operation may be partially performed, a memory may be further efficiently used.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention will be described with reference to the accompanying drawings.

With rapid development in a wireless mobile communication technology, a variety of multimedia services may be used in a wireless environment. In particular, the large capacity of transmission data and acceleration of data transmission have been ongoing. Accordingly, there is a desire for a method capable of efficiently using physically limited frequency resources. To meet such desire, proposed is a new transmission technology using multiple antennas. For example, a multiple input multiple output (MIMO) communication system using multiple antennas may be employed.

Meanwhile, great attention is being paid on an iterative detection and decoding (IDD) scheme in which a turbo principle is applied to a MIMO receiver, and researches thereon are being actively conducted. The IDD scheme may have a configuration in which a detector and a decoder are concatenated. The detector may generate soft decision information of a received signal and may transfer the generated soft decision information to the decoder. The soft decision information may be generated as a log likelihood ratio (LLR).

The decoder may generate a new soft decision value by performing decoding of each bit of the received signal by employing the provided soft decision information as priori information. Next, the new soft decision value generated by the decoder may be fed back to the detector and may be used as priori information to perform IDD. The reliability of the received signal may increase by repeating the above process a predetermined number of times.

Figure 1:
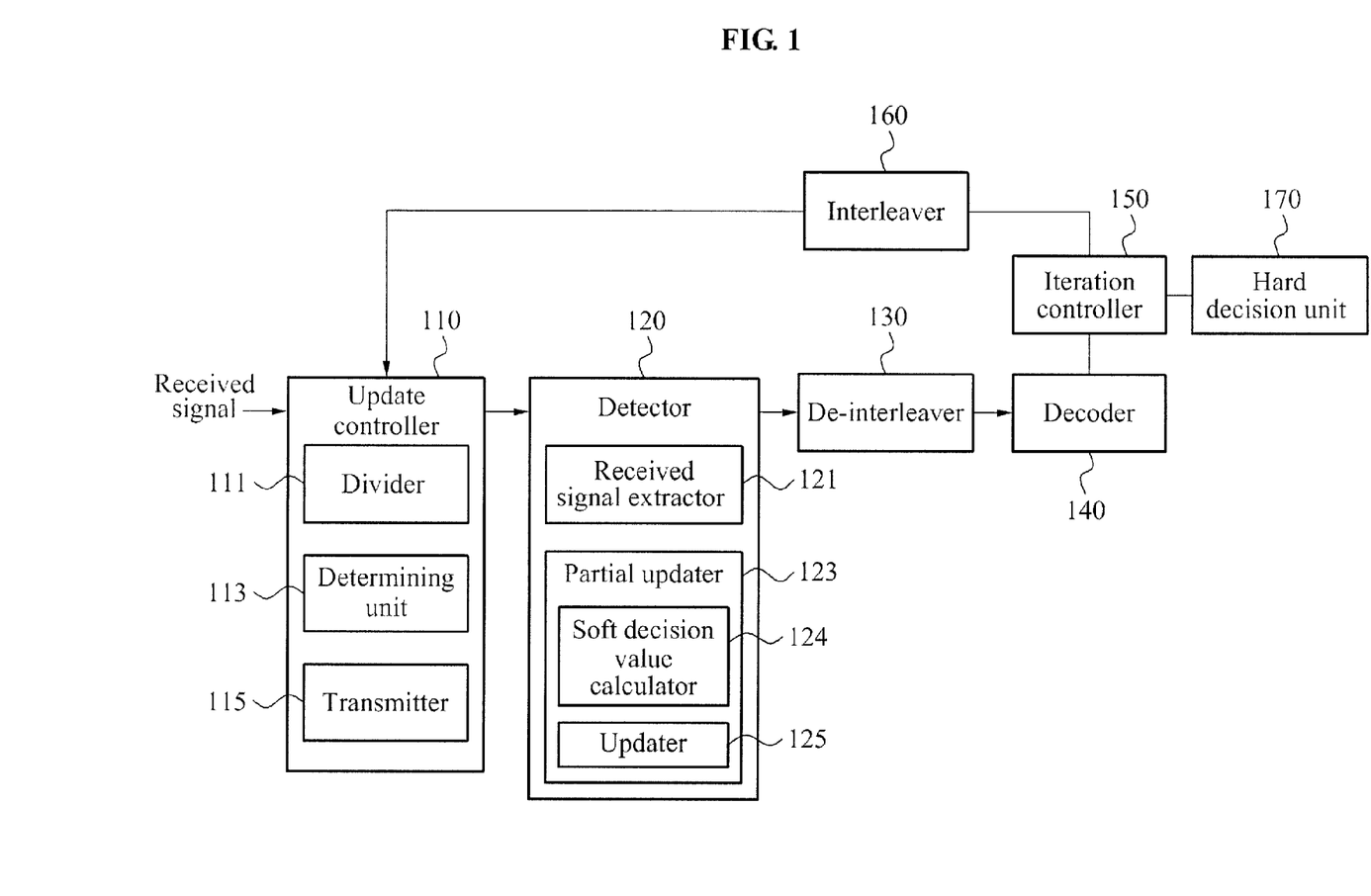
FIG. 1 is a block diagram illustrating an apparatus for iterative detection and decoding in a wireless communication system according to an embodiment of the present invention.

FIG. 1 is a block diagram illustrating an apparatus for IDD (hereinafter, IDD apparatus) in a wireless communication system according to an embodiment of the present invention.

Referring to FIG. 1, the IDD apparatus in the wireless communication system may include an update controller 110, a detector 120, a de-interleaver 130, a decoder 140, an iteration controller 150, an interleaver 160, and a hard decision unit 170.

The update controller 110 may determine a predetermined group to be updated in a first soft decision sequence, and may transmit detection control information of the determined group. The IDD apparatus may enable the update controller 110 to operate in a k-th iteration excluding a first iteration. The first soft decision sequence is a soft decision sequence generated by the decoder 140 and may be used as priori information.

The update controller 110 may include a divider 111, a determining unit 113, and a transmitter 115. The divider 111 may divide the first soft decision sequence with a predetermined length into a plurality of groups based on a predetermined criterion.

For example, the predetermined criterion may indicate a length of a group. The divider 111 may divide the first soft decision sequence into the plurality of groups having the same length, or may divide the first soft decision sequence into the plurality of groups having different lengths. The divider 111 may also divide the first soft decision sequence so that only a predetermined number of groups among the plurality of groups may have the same length.

The determining unit 113 may determine groups to be updated among the plurality of groups based on a predetermined criterion. For example, a signal to noise ratio (SNR) of a group may be applied to the predetermined criterion. The determining unit 113 may determine, as groups to be updated, groups of which SNR is less than or equal to a predetermined threshold.

The transmitter 115 may transmit detection control information including an index of the determined group, length information of the determined group, and additional control information associated with the detector 120. The transmitter 115 may include the detection control information in a detection control signaling and thereby transfer the detection control information to the detector 120. The transmitter 115 may transfer the detection control information to the detector 120. The detector 120 may generate a second soft decision sequence based on a detection operation result of a predetermined received signal portion that is extracted based on the detection control information.

The detector 120 may perform an independent detection operation with respect to each of received signal groups. A detection algorithm for detection operation according to the present invention may include all the detection schemes that may be available for IDD.

The detector 120 may include a received signal extractor 121 and a partial updater 123. The received signal extractor 121 may extract a predetermined received signal portion from a received signal sequence based on the detection control information. Here, the predetermined received signal portion may be determined based on a portion corresponding to groups that are determined by the determining unit 113 in the received signal sequence.

When a recursive operation requiring an initialization is included in an operation of the detector 120, the received signal extractor 121 may extract a predetermined received signal portion from the received signal sequence by adding a traceback length to front or back of a portion corresponding to the determined group in the received signal sequence.

When a recursive operation requiring an initialization is not included in an operation of the detector, the received signal extractor 121 may extract a received signal portion corresponding to the determined group from the received signal sequence.

The partial updater 123 may generate the second soft decision sequence by updating a soft decision value of a portion corresponding to the determined group in the first soft decision sequence, based on the detection operation result of the detector 120.

Each of the first soft decision sequence and the second soft decision sequence may be generated as an LLR.

The partial updater 123 may include a soft decision value calculator 124 and an updater 125. The soft decision value calculator 124 may calculate a soft decision value of a portion of the determined group in the first soft decision sequence, based on the detection operation result of the detector 120 and information about the determined group. The soft decision value may have an LLR value. The soft decision value calculator 124 may calculate the soft decision value of the portion corresponding to the determined group, that is, the group determined to be updated in the first soft decision sequence according to an LLR calculation scheme.

The updater 125 may update, with the calculated soft decision value, the portion corresponding to the determined group that is determined to be updated in the first soft decision sequence. That is, the updater 125 may update only the portion corresponding to the determined group, that is, the group determined to be updated by the determining unit 113, instead of updating the entire first soft decision sequence.

The de-interleaver 130 may perform de-interleaving of the second soft decision sequence. The de-interleaver 130 may rearrange bits of the second soft decision sequence.

The decoder 140 may generate a third soft decision sequence by performing decoding using a predetermined decoding algorithm with respect to the de-interleaved second soft decision sequence. For example, the predetermined decoding algorithm may include a Bahl Cocke Jellinek and Raviv Maximum A Posteriori (BCJR MAP) decoding algorithm, a Log-MAP (LMAP) algorithm, a Max-Log-MAP (MLMAP) algorithm, and the like.

The iteration controller 150 may control whether to perform IDD by determining whether the number of iterative detections satisfies a predetermined number of times. When the number of iterative detections satisfies a predetermined number of times, the iteration controller 150 may transfer a final soft decision sequence to the hard decision unit 170. Conversely, when the number of iterative detections does not satisfy the predetermined number of times, the iteration controller 150 may transfer the third soft decision sequence to the interleaver 160 for feedback. Here, the number of iterative detection may also indicate the number of IDDs.

The interleaver 160 may perform interleaving of the third soft decision sequence. The interleaver 160 may arrange bits of the third soft decision sequence according to a rule corresponding to the de-interleaver 130.

The hard decision unit 170 may calculate a hard decision value with respect to the final soft decision sequence that is transferred from the iteration controller 150. The hard decision unit 170 may calculate the hard decision value from the final soft decision sequence using a general hard decision value calculation scheme.

Figure 2:
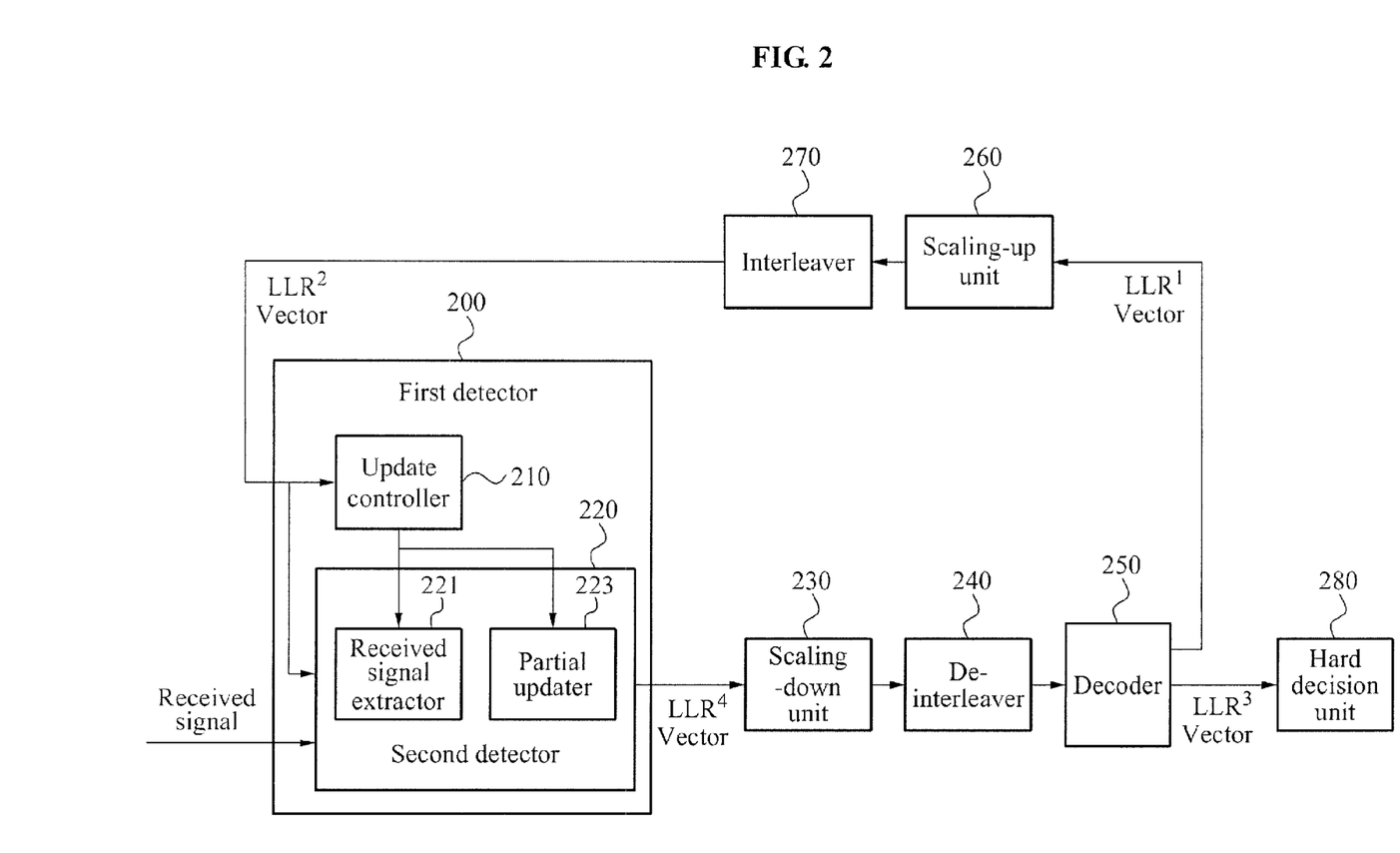
FIG. 2 is a block diagram illustrating an apparatus for iterative detection and decoding in a wireless communication system according to another embodiment of the present invention.

FIG. 2 is a block diagram illustrating an IDD apparatus in a wireless communication system according to another embodiment of the present invention.

Referring to FIG. 2, the IDD apparatus in the wireless communication system may perform IDD an $I_n$ number of times using a received signal with a length N. An $LLR^1$ vector indicates an LLR vector that is intermediately output from a decoder 250. An $LLR^2$ vector indicates an LLR vector that is re-input into a first detector 200 after the $LLR^1$ vector is scaled up by a scaling-up unit 260 and is interleaved by an interleaver 270 every iteration. An $LLR^4$ vector indicates an output LLR vector of the first detector 200 and an $LLR^3$ vector indicates a final LLR vector of which iterative operation is completed.

The IDD apparatus in the wireless communication system according to an embodiment of the present invention may be applied to a k-th iteration excluding a first iteration from a total of $I_n$ IDDs.

The first detector 200 may include an update controller 210 and a second detector 220. The update controller 210 may divide an input soft decision sequence, for example, the $LLR^2$ vector into a plurality of groups, may determine groups to be updated among the plurality of groups based on a predetermined criterion, and may transfer detection control information of the determined groups to a received signal extractor 221 and a partial updater 223 of the second detector 220.

The received signal extractor 221 may extract a portion corresponding to the determined groups from a received signal sequence based on the detection control information. Alternatively, the received signal extractor 221 may extract a predetermined received signal portion by adding a traceback length to front or back of the portion corresponding to the determined group.

The partial updater 223 may calculate a soft decision value of a portion corresponding to a group determined to be updated in the $LLR^2$ vector, based on a detection operation result that is calculated from the extracted received signal portion and information about the determined group, and may generate the $LLR^4$ vector by updating the $LLR^2$ vector with the calculated soft decision value.

The $LLR^4$ vector may pass through a scaling-down unit 230 and a de-interleaver 240 and then, be transferred to the decoder 250. The decoder 250 may generate a new soft decision value, for example, the $LLR^3$ vector. When a total $I_n$ number of iterations is completed, the $LLR^3$ vector may be transferred to a hard decision unit 280.

Figure 3:
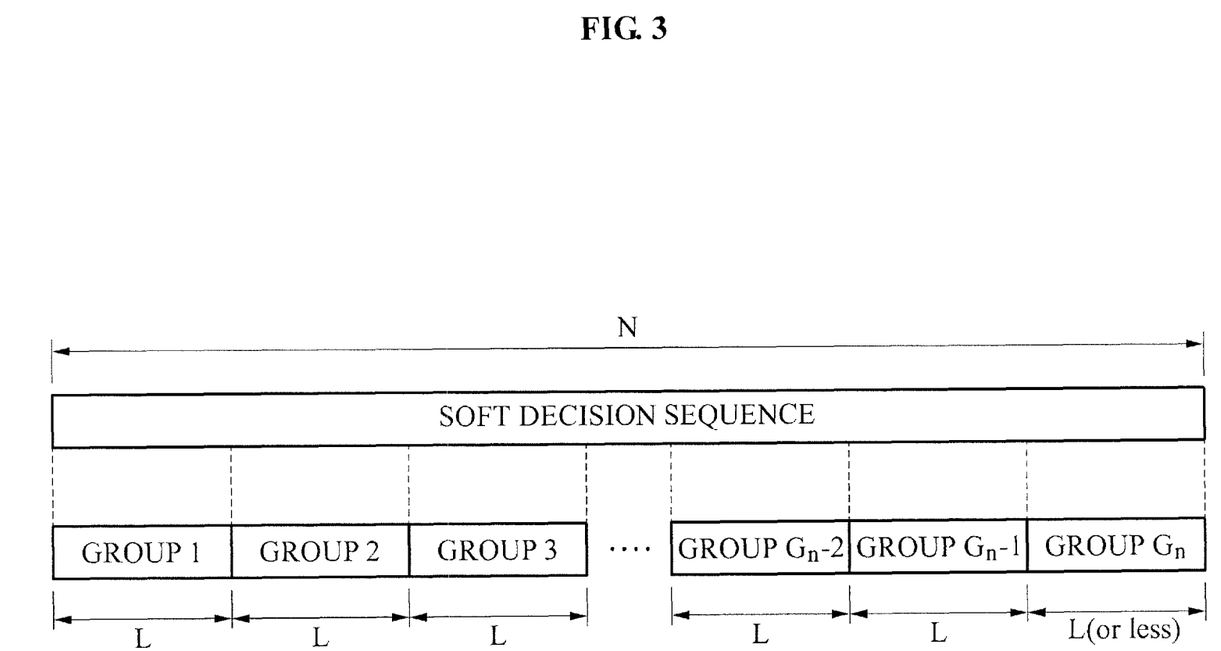
FIG. 3 is a diagram illustrating a case where a soft decision sequence is divided into a plurality of groups according to an embodiment of the present invention.

FIG. 3 is a diagram illustrating a case where a soft decision sequence is divided into a plurality of groups according to an embodiment of the present invention.

A process of dividing an input soft decision sequence, for example, an $LLR^2$ vector, into a plurality of groups will be described with reference to FIG. 3. An IDD apparatus in a wireless communication system according to an embodiment of the present invention may divide the $LLR^2$ vector into $G_n$ groups having the same length L. When the length L designated by a designer is a divisor of a length N of the soft decision sequence, the soft decision sequence may be divided into an integer $G_n$ number of groups. Otherwise, a final group, for example, the group $G_n$ may be configured as a group having a length shorter than the length L. The present invention is not limited to a scheme of dividing the soft decision sequence into $G_n$ groups having the length L, and may employ a variety of group division schemes for partial updating of the soft decision sequence.

Figure 4:
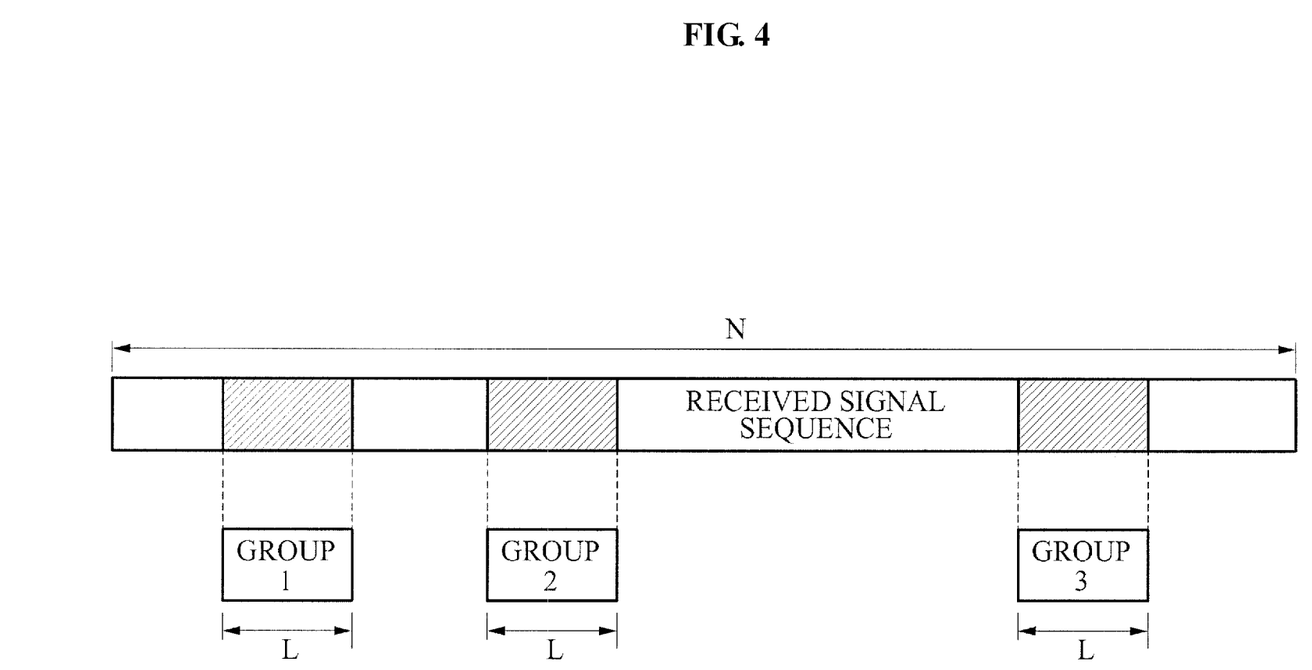
FIG. 4 is a diagram illustrating a case where a predetermined received signal portion corresponding to a group is extracted from a received signal sequence according to an embodiment of the present invention.

FIG. 4 is a diagram illustrating a case where a predetermined received signal portion corresponding to a group is extracted from a received signal sequence according to an embodiment of the present invention.

Referring to FIG. 4, an IDD apparatus in a wireless communication system according to an embodiment of the present invention may extract a received signal based on detection control information when performing a k-th iterative detection.

An extraction scheme may vary based on an operation form of a detector. When a to recursive operation requiring an initialization is not included in an operation of the detector, the IDD apparatus may extract a predetermined received signal portion from a received signal sequence by only a length of each group that is determined to be updated.

On the contrary, when the recursive operation requiring the initialization is included in the operation of the detector, the IDD apparatus may extract a predetermined received signal portion by adding a traceback length T to front or back of a length of each group. Here, the traceback length T may be identical to a traceback T of a Bahl-Cocke-Jelinek-Raviv (BCJR) scheme for enhancing the complexity and the memory efficiency.

For example, the detector using a forward-and-backward scheme based on the recursive operation requiring the initialization may extract a predetermined received signal portion from a received signal sequence N by additionally extending front of a length of each group by the traceback T in the case of forward, and may extract a predetermined received signal portion from the received signal sequence N by additionally extending back of the length of each group by the traceback T in the case of backward.

Also, a forward-only-or-backward-only extraction or a forward-and-backward extraction may be applicable based on purposes of a designer.

Referring to FIG. 4, it is assumed that three groups having the same length L are selected as groups to be updated. Also, FIG. 4 shows a case where a recursive operation requiring an initialization is not included in an operation of the detector. The detector may extract a predetermined received signal portion from the received signal sequence N by only a length L of each group determined to be updated.

Figure 5:
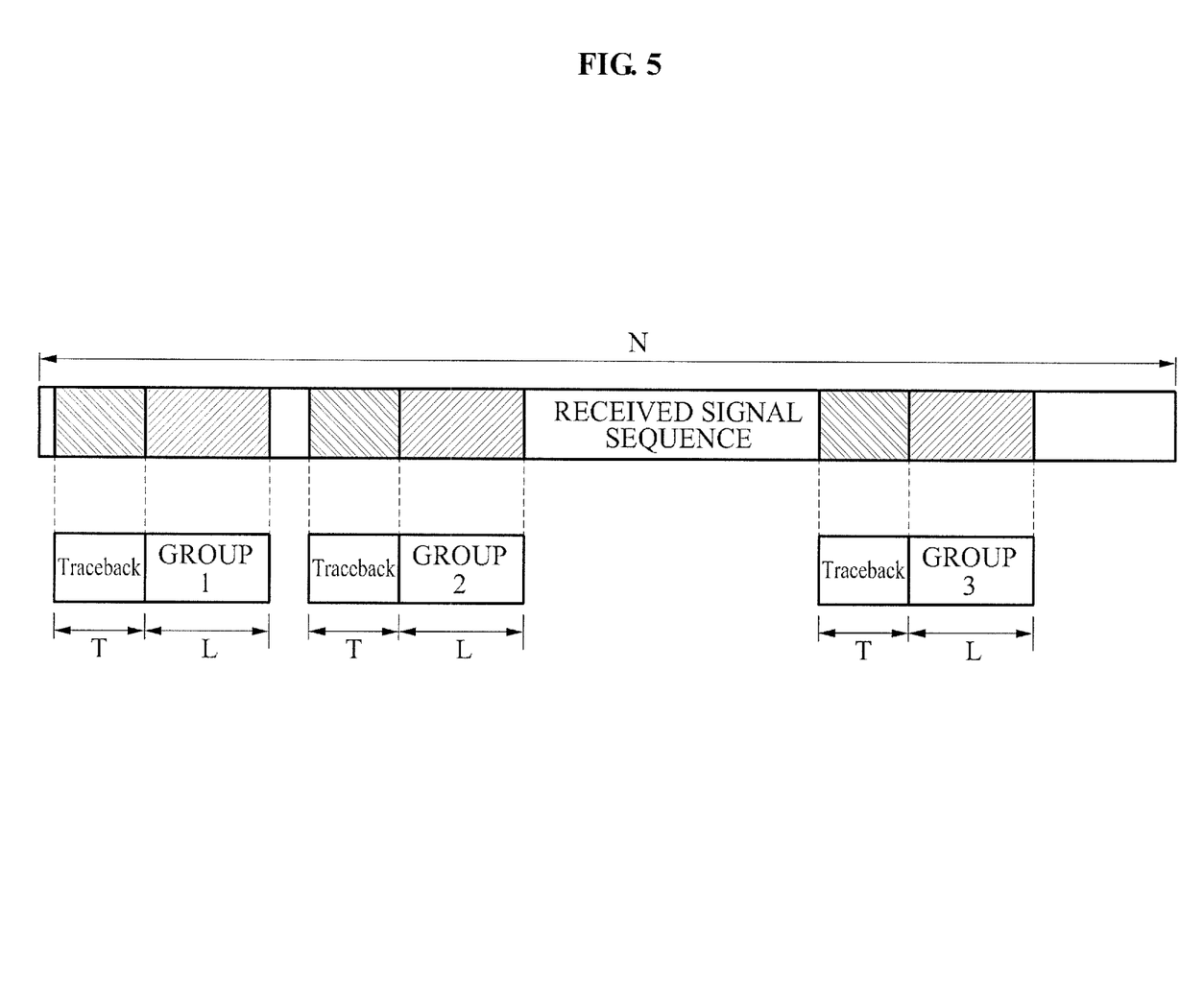
FIG. 5 is a diagram illustrating a case where a predetermined received signal portion corresponding to a group is extracted from a received signal sequence according to another embodiment of the present invention.

FIG. 5 is a diagram illustrating a case where a predetermined received signal portion corresponding to a group is extracted from a received signal sequence according to another embodiment of the present invention.

Referring to FIG. 5, it is assumed that three groups having the same length L are selected as groups to be updated. Also, FIG. 5 shows a case where a recursive operation requiring an initialization is included in an operation of the detector. The detector may extract a predetermined received signal portion from a received signal sequence N by additionally extending front of a portion corresponding to a length L of each group by a traceback length T.

Figure 6:
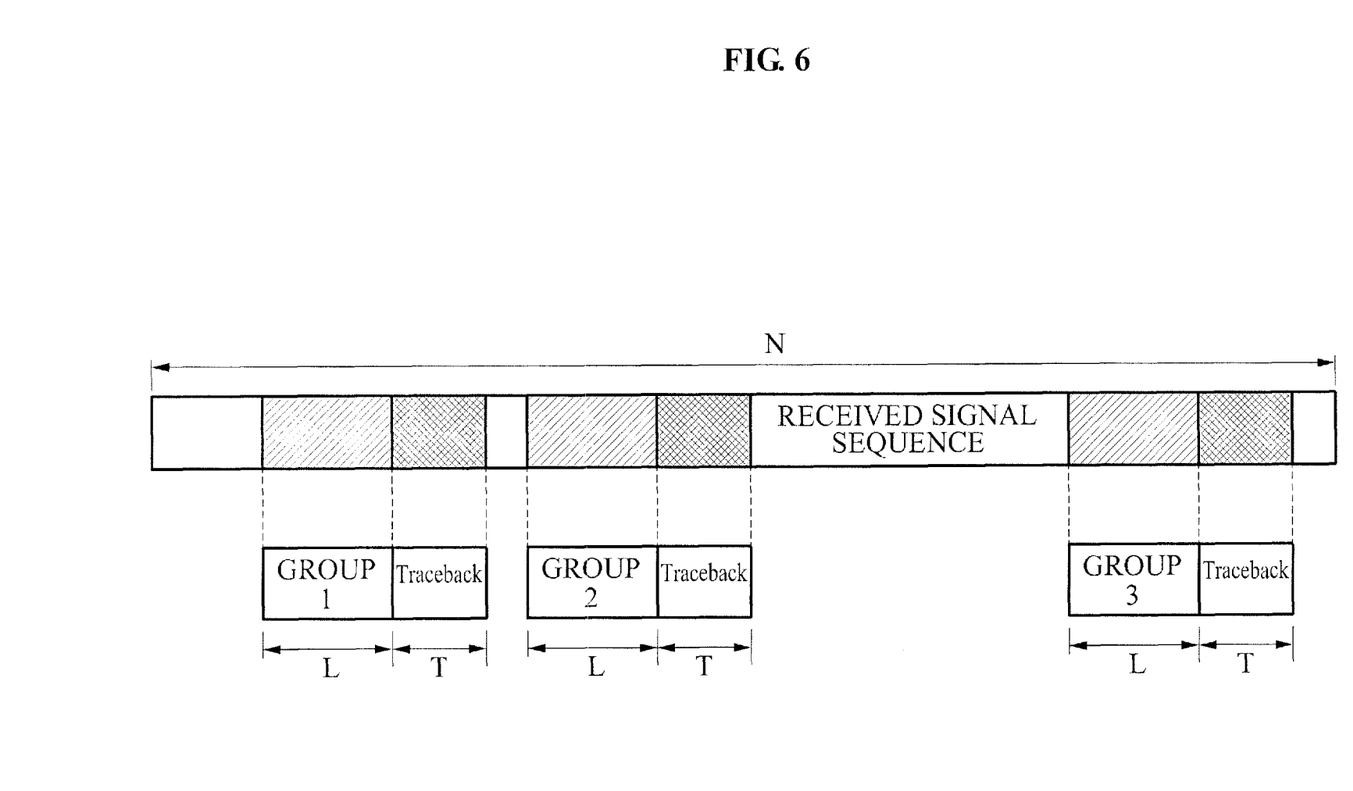
FIG. 6 is diagram illustrating a case where a predetermined received signal portion corresponding to a group is extracted from a received signal sequence according to still another embodiment of the present invention.

FIG. 6 is diagram illustrating a case where a predetermined received signal portion corresponding to a group is extracted from a received signal sequence according to still another embodiment of the present invention.

Referring to FIG. 6, it is assumed that three groups having the same length L are selected as groups to be updated. Also, FIG. 6 shows a case where a recursive operation requiring an initialization is included in an operation of the detector. The detector may extract a predetermined received signal portion from a received signal sequence N by additionally extending back of a portion corresponding to a length L of each group by a traceback length T.

Figure 7:
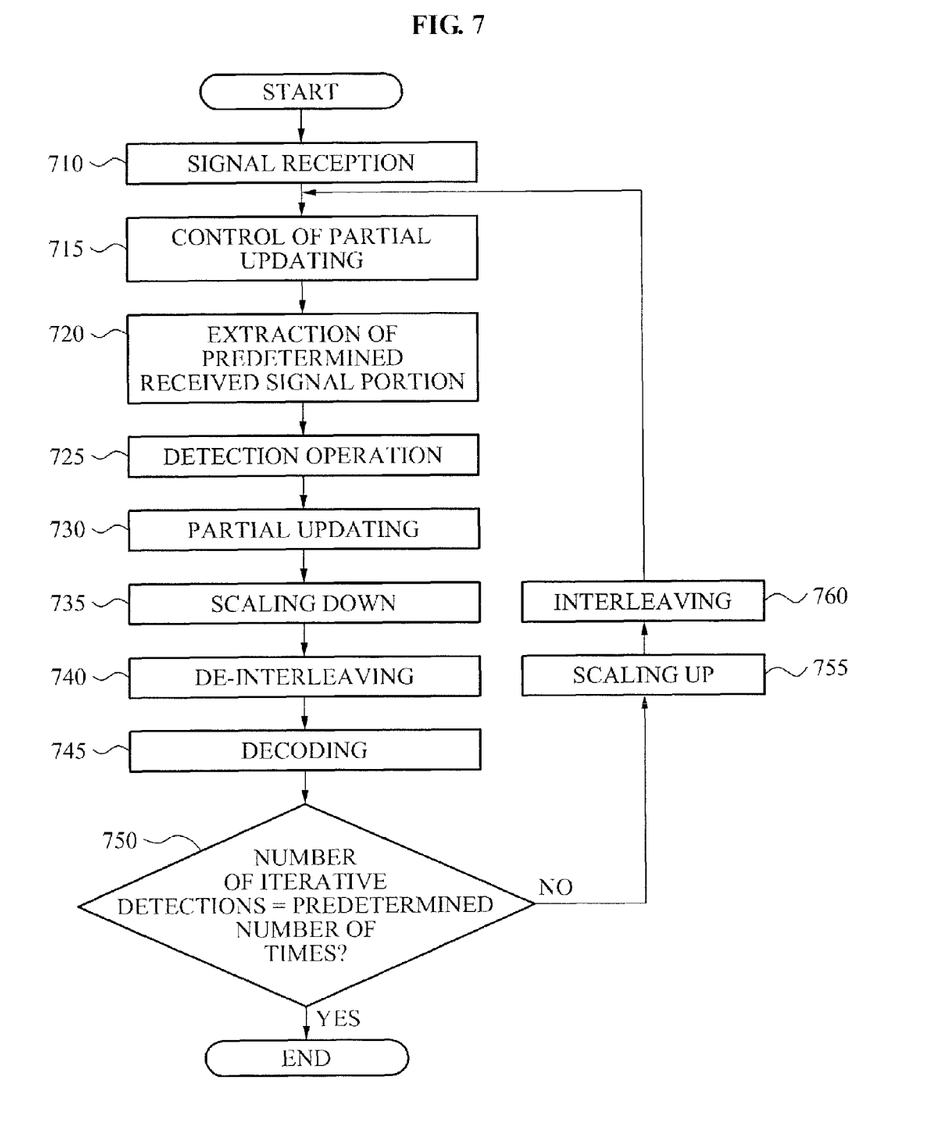
FIG. 7 is a flowchart illustrating a method for iterative detection and decoding in a wireless communication system according to an embodiment of the present invention.

FIG. 7 is a flowchart illustrating a method for IDD in a wireless communication system according to an embodiment of the present invention.

In operation 710, an IDD apparatus may receive a signal that is transmitted from a transmission apparatus of the wireless communication system, and a first soft decision sequence that is fed back from a decoder.

In operation 715, the IDD apparatus may determine a predetermined group to be updated in the first soft decision sequence, and may transmit detection control information of the determined group.

The IDD apparatus may divide the first soft decision sequence with a predetermined length into a plurality of groups having the same length.

The IDD apparatus may determine, as groups to be updated, groups of which SNR is less than or equal to a predetermined threshold among the plurality of groups.

In operation 720, the IDD apparatus may extract a predetermined received signal portion from a received signal sequence based on the detection control information. The detection control information may include an index of the determined group, length information of the determined group, and additional control information. Here, the predetermined received signal portion may be determined based on a portion corresponding to the groups that are determined to be updated in the received signal sequence.

In operation 725, the IDD apparatus may perform a detection operation with respect to the extracted received signal portion.

In operation 730, the IDD apparatus may generate a second soft decision sequence by updating a soft decision value of a portion corresponding to the determined group in the first soft decision sequence, based on the detection operation result of the extracted received signal portion. Each of the first soft decision sequence and the second soft decision sequence may be calculated using an LLR.

The IDD apparatus may calculate the soft decision value of the portion corresponding to the determined group, that is, the group that is determined to be updated in the first soft decision sequence, based on the detection operation result and information about the determined group.

The IDD apparatus may update, with the calculated soft decision value, the portion corresponding to the determined group in the first soft decision sequence.

In operation 735, the IDD apparatus may scale down the second soft decision sequence.

In operation 740, the IDD apparatus may perform de-interleaving of the scaled-down second soft decision sequence.

In operation 745, the IDD apparatus may generate a third soft decision sequence by performing decoding using a predetermined decoding algorithm to the de-interleaved second soft decision sequence.

In operation 750, the IDD apparatus may determine whether the number of iterative detections satisfies a predetermined number of times. When the number of iterative detections satisfies the predetermined number of times, the IDD apparatus may determine a hard decision value by using the third soft decision sequence as a final soft decision sequence. The number of iterative detections may indicate the number of IDDs.

On the contrary, when the number of iterative detections does not satisfy the predetermined number of times, the IDD apparatus may scale up the third soft decision sequence in operation 755.

In operation 760, the IDD apparatus may perform interleaving of the scaled-up third soft decision sequence. The interleaved third soft decision sequence may be input as priori information that is required for operation 715.

The above-described exemplary embodiments of the present invention may be recorded in computer-readable media including program instructions to implement various operations embodied by a computer. The media may also include, alone or in combination with the program instructions, data files, data structures, and the like. The program commands stored in the media may be specially designed for the present invention or may be known to those skilled in the computer software art.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for iterative detection and decoding in a wireless communication system, the apparatus comprising:
   an update controller to determine a predetermined group to be updated in a first soft decision sequence, and to transmit detection control information of the determined group; and
   a detector to generate a second soft decision sequence based on a detection operation result of a predetermined received signal portion that is extracted based on the detection control information, wherein
   the detector comprises: a received signal extractor to extract a predetermined received signal portion from a received signal sequence based on the detection control information; and
   a partial updater to generate the second soft decision sequence by updating a soft decision value of a portion corresponding to the determined group in the first soft decision sequence, based on the detection operation result of the extracted received signal portion.

2. The apparatus of claim 1, wherein the update controller comprises: a divider to divide the first soft decision sequence with a predetermined length into a plurality of groups based on a predetermined criterion.

3. The apparatus of claim 2, wherein the update controller further comprises: a determining unit to determine groups to be updated among the plurality of groups based on a predetermined criterion.

4. The apparatus of claim 1, wherein the update controller comprises: a transmitter to transmit detection control information comprising an index of the determined group, length information of the determined group, and additional control information.

5. The apparatus of claim 1, wherein when a recursive operation requiring an initialization is included in an operation of the detector, the received signal extractor extracts a predetermined received signal portion from the received signal sequence by adding a traceback length to front or back of a portion corresponding to the determined group in the received signal sequence.

6. The apparatus of claim 1, wherein when a recursive operation requiring an initialization is not included in an operation of the detector, the received signal extractor extracts a received signal portion corresponding to the determined group from the received signal sequence.

7. The apparatus of claim 1, wherein the detector performs a detection operation with respect to the extracted received signal portion.

8. The apparatus of claim 1, wherein the partial updater comprises: a soft decision value calculator to calculate the soft decision value of the portion corresponding to the determined group in the first soft decision sequence, based on the detection operation result and information about the determined group.

9. The apparatus of claim 8, wherein the partial updater further comprises: an updater to update, with the calculated soft decision value, the portion corresponding to the determined group in the first soft decision sequence.

10. The apparatus of claim 1, further comprising:
    a de-interleaver to perform de-interleaving of the second soft decision sequence;
    a decoder to generate a third soft decision sequence by performing decoding using a predetermined decoding algorithm with respect to the de-interleaved second soft decision sequence; and
    an iteration controller to control whether to perform iterative detection and decoding by determining whether the number of iterative detections satisfies a predetermined number of times.

11. A method for iterative detection and decoding in a wireless communication system, the method comprising:
    determining a predetermined group to be updated in a first soft decision sequence, and transmitting detection control information of the determined group;
    extracting a predetermined received signal portion from a received signal sequence based on the detection control information; and
    generating a second soft decision sequence by updating a soft decision value of a portion corresponding to the determined group in, the first soft decision sequence, based on the detection operation result of the extracted received signal portion.

12. The method of claim 11, wherein the transmitting comprises: dividing the first soft decision sequence with a predetermined length into a plurality of groups having the same length.

13. The method of claim 12, wherein the transmitting further comprises: determining, as groups to be updated among the plurality of groups, groups of which measured signal to noise ratio (SNR) is less than or equal to a predetermined threshold.

14. The method of claim 11, wherein each of the first soft decision sequence and the second soft decision sequence is a log likelihood ratio (LLR).

15. The method of claim 11, wherein the generating comprises: calculating the soft decision value of the portion corresponding to the determined group in the first soft decision sequence, based on the detection operation result and information about the determined group.

16. The method of claim 15, wherein the generating further comprises: updating, with the calculated soft decision value, the portion corresponding to the determined group in the first soft decision sequence.

17. The method of claim 11, further comprising: performing de-interleaving of the second soft decision sequence; generating a third soft decision sequence by performing decoding using a predetermined decoding algorithm with respect to the de-interleaved second soft decision sequence; and performing interleaving of the third soft decision sequence when the number of iterative detections does not satisfy a predetermined number of times.

18. An apparatus for iterative detection and decoding in a wireless communication system, the apparatus comprising:
   an update controller to determine a predetermined group to be updated in a first soft decision sequence, and to transmit detection control information of the determined group; and
   a detector to generate a second soft decision sequence based on a detection operation result of a predetermined received signal portion that is extracted based on the detection control information, wherein
   the update controller comprises a transmitter to transmit detection control information comprising an index of the determined group, length information of the determined group, and additional control information.

* * * * *